United States Patent [11] 3,620,799

[72] Inventors Max W. Hoelscher
 Lancaster;
 Paul D. Strubhar, Pequea, both of Pa.
[21] Appl. No. 787,200
[22] Filed Dec. 26, 1968
[45] Patented Nov. 16, 1971
[73] Assignee RCA Corporation

[54] METHOD FOR METALLIZING A CERAMIC BODY
 10 Claims, No Drawings
[52] U.S. Cl. .................................................. 117/22,
 29/473.1, 106/1, 117/27, 117/71, 117/160 R,
 117/25
[51] Int. Cl. ..................................................... C04b 41/14,
 C23c 17/00
[50] Field of Search ........................................ 117/22,
 160, 27, 25; 106/1

[56] References Cited
 UNITED STATES PATENTS
2,667,427 1/1954 Nolte ............................ 117/22
2,835,967 5/1958 Umblia .......................... 117/22 X
2,903,788 9/1959 Pryslak .......................... 117/22 X
2,985,547 5/1961 Luks ............................. 117/160
3,023,492 3/1962 Bistow .......................... 117/22 X
3,241,995 3/1966 Pulfrich et al. ................ 117/22
3,290,171 12/1966 Zollman et al. ................ 117/160
3,312,533 4/1967 Botden et al. ................. 117/22 X
3,347,704 10/1967 Meyer ........................... 117/22 X
3,352,694 11/1967 Reed et al. .................... 117/160 X
3,410,714 11/1968 Jones ............................ 117/27 X
 FOREIGN PATENTS
1,362,533 4/1964 France .......................... 106/1

Primary Examiner—Alfred L. Leavitt
Assistant Examiner—J. R. Batten, Jr.
Attorney—Glenn H. Bruestle ABSTRACT: A method for metallizing a ceramic body comprising coating a surface of the ceramic body with a metallizing composition consisting essentially of 10 to 90 weight parts uncoated molybdenum or tungsten metal particles, 4 to 80 weight parts molybdenum or tungsten metal particles which have an adherent coating of nickel, iron, and/or cobalt metal, and 2 to 27 weight parts ceramic sinter powder. The coated ceramic body is then heated in the range of about 1,100° to 1,500° C. in a reducing atmosphere to produce a sintered metal coating on the ceramic body. Then, the metal coating on the ceramic body may be brazed or soldered to a metal body or to another metallized body.

METHOD FOR METALLIZING A CERAMIC BODY

BACKGROUND OF THE INVENTION

This invention relates to a method for preparing a ceramic-to-metal joint and particularly to a ceramic-to-metal joint which is both strong and vacuum tight.

Strong, vacuum-tight ceramic-to-metal joints are needed in many applications, such as in electronic vacuum tubes. Such joints are made by first metallizing the surface of the ceramic body and then brazing or soldering the metallized surface to a metal body or to another metallized surface. A satisfactory metallization is a metal layer which is bonded to the ceramic and whose surface is essentially pure metal. The exact nature of the bond between the ceramic body and the metallization is not definitely known. What is known is a number of processes which form such bonds. With each ceramic body composition and treatment, there is probably a set of conditions during the metallizing heating that produces the optimum strength and reliability in the bond. The materials that are present during the metallizing heating and the physical condition and concentration of these chemicals all affect the optimum conditions.

Metallizing is usually accomplished by sintering a layer of a refractory metal, such as molybdenum or tungsten, on the surface of the ceramic body. For most practical purposes, the sintering of the refractory metal is aided by some means in order to reduce the metallizing temperature below 1750° C. Metallizing temperatures above 1750° C. are very detrimental to the ceramic being metallized. Even at temperatures between 1450° C. and 1700° C., the ceramic body exhibits grain growth, which may be detrimental to its strength, and hot creep to the point where creepage is a severe problem, and expensive and cumbersome jigging is necessary. Furthermore, furnaces which operate at these high temperatures are expensive and difficult to maintain.

On sintering aid is the presence of water vapor in the ambient atmosphere used during the metallizing heating step. The concentration of water vapor is controlled by controlling the dew point of the gas atmosphere and the composition of the gas. Another sintering aid is the presence of "glassy" additives in the metallizing composition as disclosed, for example, in U.S. Pat. No. 3,023,492 to R. H. Bristow. Such additives enhance the adherence of the sintered metal layer to the ceramic and improve the strength of the metallizing layer itself. With this aid, the choice of ceramic compositions is limited because many of the available bodies either react with or imbibe the glassy additives so quickly that they cannot be retained in the metal layer to perform either the adherence or the sintering function. Still another sintering aid is the presence of auxiliary metals such as manganese, iron, yttrium, and niobium in the metallizing composition as disclosed, for example, in U.S. Pat. No. 2,938,806 to P. C. Padula. These auxiliary metals are recognized as agents that both reduce the sintering temperature and contribute to the adherence of the metallization. It is believed that the reaction products of these metals with the ceramic are the sintering aids rather than the metals themselves. Nickel, iron, cobalt and other metals which form solid diffusion bonds with the refractory metals and to themselves in the range of 900° to 1200° C. have been used. These metals have been added to the metallizing compositions as finely divided powders in elemental form or as oxides or salts of the metals.

The structure and thickness of the sintered metal layer are very important to the ultimate strength of the joint. It has been disclosed, as in U.S. Pat. No. 3,386,159 to A. Milch et al., that a porous structure filled with a suitable material will improve the strength or other characteristics of the joint.

It is believed that two or more interrelated considerations must be optimized in a common environmental process treatment to produce a joint with optimum strength and optimum adherence. With ideal joints, the tensile strength of the ceramic body is the limiting factor in the quality of the joint. Few metallizing systems approach this ideal joint and none found to date do so reliably.

SUMMARY OF THE INVENTION

The novel method includes coating the surface of a ceramic body with a metallizing composition consisting essentially of:
  10 to '90 weight parts uncoated molybdenum or tungsten metal particles,
  4 to 80 weight parts molybdenum or tungsten metal particles having an adherent coating of nickel, iron and/or cobalt metal, and
  2 to 27 weight parts sinter powder consisting essentially of one or a combination of a magnesium aluminum silicate, a calcium aluminum silicate, and a manganese silicate.

The coated body is then heated at a metallizing temperature in the range of about 1100° to 1500° C. in a reducing atmosphere to produce a sintered metal coating (metallization) on the ceramic body. The metal coating on the ceramic body may then be brazed or soldered to a metal body or to another metallized body.

Using a blend of coated and uncoated particles of molybdenum or tungsten particles permits lower metallizing temperatures to be used for producing the metal layer than were used in previous processes. The use of lower metallizing temperatures results in less furnace cost and lower losses of product due to warpage of the ceramic. In addition, ceramic bodies which were previously unusable because of the higher metallizing temperatures may now be used. Using blends of coated and uncoated metal particles also permits a practical control of the process in industrial manufacturing.

By using one or more of the sinter powders, the final joint is both strong and vacuum tight. Unlike previously used glasses in compositions of this type, the metallization does not expel molten glass during the brazing or soldering operation.

DESCRIPTION OF THE PREFERRED EMBODIMENTS

In the examples which are described below, the following materials are used:

A. Uncoated Molybdenum Powder—This is a very high-purity (99.8 percent or more) metal powder having a particle size range of 1 to 20 microns.

B. Coated Molybdenum Powder—This is a very high-purity (99.8 percent or more) metal powder having an average particle size of about 3.5 to 5.0 microns. The particles have a layer of nickel metal plated thereon. The nickel plating is about 5 to 7 weight percent of the weight of the molybdenum.

C. Manganese Powder—This is a very high-purity metal powder which is 325 mesh and finer. The powder is free of any applied coating.

D. Magnesium Sinter Powder—This is a magnesium aluminum silicate prepared by intimately mixing 300 weight parts of magnesium oxide (fluffy), 50 weight parts of aluminum oxide (325 mesh, technical grade) and 650 weight parts of silicon dioxide (325 mesh, technical grade), sintering the mixture at 1300° C. for about 1 hour and then grinding the sintered mass to approximately 2 microns average particle size.

E. Calcium Sinter Powder—This is a calcium aluminum silicate sinter powder prepared by intimately mixing 404 weight parts of calcium oxide (325 mesh, technical grade), 108 weight parts of aluminum oxide (325 mesh, technical grade), and 488 weight parts of silica (325 mesh, technical grade), sintering the mixture at about 1300° C. for about 1 hour, and then grinding the sintered mass to approximately 2 microns average particle size.

F. Manganese Sinter Powder—This is a manganese silicate powder prepared by intimately mixing 620 weight parts of silica (325 mesh, technical grade) with 465 weight parts of manganese dioxide (technical grade), sintering the mixture at about 1170° C. for about one-half hour, and then grinding the sintered mass to about 2 microns average particle size.

G. Binder—This is a commercially available binder such as an ethyl cellulose binder. The binder has a capability of binding the composition before sintering and of being substantially completely volatilized by heating below the sinter temperature without blistering the coating.

H. Vehicle—This may be any liquid which is compatible with the binder. For ethyl cellulose binders, ethylene glycol dibutyl ether is preferred.

In the examples which are described below, the metallizing composition is prepared by intimately mixing the dry ingredients, adding the vehicle as required, further mixing the composition and, preferably heating to about 150° C. for about 1 hour. When the mixture has cooled to room temperature the mixture is thinned to an optimum viscosity by adding a suitable amount of vehicle. The metallizing composition is then coated on a surface of the ceramic body by screening through a 135 mesh screen. Other screen mesh sizes may be used. Other methods of application such as spraying, painting, or transfer tape can also be used. The coated ceramic body is then heated as indicated in each example and then cooled to room temperature to metallize the ceramic body. The metallized ceramic body is placed in a jib opposite a similarly metallized ceramic body with a layer of Nicoro braze material (nickel-copper-gold alloy) therebetween. The assembly is heated at about 1050° C. for 10 minutes and then cooled thereby completing the joint.

To test the modulus of rupture of the joint, the formed bodies are machined into strength test bars by diamond wheel cutting and grinding. Then, with three point loading at the rate of about 1,000,000 p.s.i. per minute, the bars are loaded until broken. Most breaks occur in the ceramic body at a distance of more than 0.025 inch from the joint. The load is usually greater than that load required to break the body without a joint under the same conditions.

EXAMPLE 1

Prepare a metallizing composition of the following formulation:

57 weight parts uncoated molybdenum powder (Material A)
39 weight parts coated molybdenum powder (Material B)
6 weight parts manganese powder (Material C)
6.75 weight parts magnesium sinter powder (Material D)
6.75 weight parts calcium sinter powder (Material E)
1.5 weight parts manganese sinter powder (Material F)
4.0 weight parts binder (Material G)
18 weight parts vehicle (Material H)

Then, a surface of a beryllia ceramic body is coated with the formulation to a thickness of about 2.5 mils. After coating, the ceramic body is heated in a reducing atmosphere consisting essentially of nitrogen containing about 10 to 25 weight percent hydrogen and having a dew point between +20° C. and −25° C. The heating is conducted at about 1200° to 1300° C., for example, at about 1260° C. for about 30 minutes and then cooled.

EXAMPLES 2 TO 5

The table discloses a family of compositions containing increasing proportions of nickel-plated molybdenum powder and decreasing proportions of unplated powder. In these examples, a 95 percent alumina ceramic body was coated with the formulation and then heated at the metallizing temperature in the manner otherwise described in example 1.

TABLE

Example (Parts by Weight)

| Material | 2 | 3 | 4 | 5 |
|---|---|---|---|---|
| A | 90.0 | 82.5 | 76.0 | 19.0 |
| B |  | 7.5 | 19.0 | 77.0 |
| D | 4.5 | 4.5 | 4.5 | 4.5 |
| E | 4.5 | 4.5 | 4.5 | 4.5 |
| F | 1.0 | 1.0 | 1.0 | 1.0 |
| G | 3.5 | 3.5 | 3.5 | 3.5 |
| H | 18 | 18 | 18 | 18 |
| Metallizing Temp. | 1540° C. | 1425° C. | 1280° C. | 1220° C. |

The modulus of rupture tests on strength bars made under examples 2 to 5 yielded strengths which were about the same in the neighborhood of about 55,000 p.s.i. It will be noted however that the metallizing temperature is reduced from 1540° C. to 1425° C. with a small substitution of plated particles and then progressively to 1220° C. with increasing substitutions.

General Considerations

The metallizing composition consists essentially of:
10 to 90 weight parts uncoated molybdenum or tungsten metal powder
4 to 80 weight parts coated molybdenum or tungsten metal powder
0 to 10 weight parts uncoated manganese metal powder
2 to 27 weight parts sinter powder The uncoated molybdenum or tungsten metal powder is preferably a high-purity (99.8 percent or more) material, although materials of other grades may be used. It is preferred that this powder have an average particle size of about 3.5 to 5.0 microns.

The coated molybdenum and tungsten metal powders may be the same as the uncoated molybdenum and tungsten metal powders except for the coating on the particles. The coating is of nickel, iron, or cobalt metal, preferably applied by plating the particles, although other adherent metal coatings are suitable. It is not suitable to merely mix molybdenum or tungsten particles with finer particles of the coating metal. The amount of coating metal can vary from about 0.5 to 10 weight percent of the weight of the particles that are coated.

The presence of uncoated manganese particles in the composition is optional. Additions of manganese particles are very desirable for metallizing beryllia (99.5 percent or more BeO) bodies and very high alumina (98 percent or more $Al_2O_3$) bodies. Additions of manganese particles are preferably omitted where manganese or chromium is included in the ceramic body. Very high-purity manganese metal particles are preferred although other grades may be used. The average particle size is −325 mesh and finer.

The sinter powder consists essentially of a combination of a magnesium aluminum silicate, a calcium aluminum silicate and a manganese silicate. It is a combination of all three of these silicates in the following proportions per 100 weight parts of metal powder: 1 to 12 weight parts magnesium aluminum silicate, 1 to 12 weight parts calcium aluminum silicate, and 0.2 to 3 weight parts manganese silicate.

The metallizing composition is formulated with suitable binders and vehicles which are compatible with the other constituents of the formulation and with the processing steps that are used for making the metallization. One may use the binders, vehicles, and methods of formulation disclosed in U.S. Pat. No. 3,290,171 to James A. Zollman et al. The composition is preferably cooked at about 150° C. for about 1 hour. This cooking improves the properties of the metallizing layer subsequently produced with the metallizing composition.

The metallizing composition is applied to a surface of a ceramic body. The ceramic body may be of any compositional type used for electrical insulation and whose maturing temperature is greater than the metallizing temperature used. It is preferred to use an alumina ceramic or a beryllia ceramic body. One advantage of the novel method is the fact that it may be used with different types of ceramic bodies and particularly with beryllia and alumina ceramic bodies. The metallizing composition may be applied using any of the usual methods such as screening, painting, spraying, dipping, doctor blading, etc. Transfer tape may also be used. The metallizing composition is applied as a thin layer preferably about 15 to 75 microns thick, although layers which are 12 to 100 microns thick may be used. The thickness of the applied layer is adjusted to provide sintered layer after firing which is about 12 to 36 microns thick. This range has been found to yield joints with optimum strength. After application, the applied layer is dried to remove the vehicle.

Following drying, the coated ceramic body is heated at about 1100 to 1500° C. (metallizing temperatures) in a reducing atmosphere until the layer is sintered to the surface of the ceramic and produces a metallized layer. The reducing atmosphere is preferably 10 to 40 weight percent hydrogen gas and 90 to 60 weight percent nitrogen gas and, further, contains sufficient water vapor to have a dew point higher than −25° C. up to +20° C. This mixture is sometimes referred to as wet forming gas. Drier (lower dew point) atmospheres produce weaker bonds between the metallization and the ceramic body. The metallizing heating ordinarily requires about 1 hour but may be as little as 10 minutes and as much as 3 hours. The metallized ceramic body is then cooled to room temperature.

During the metallizing heating, the metal particles agglomerate and grow into a porous metallic structure with some particle size growth. The surface of the metal layer is metallic which is easily soldered or brazed to. Also, during the metallizing heating, the silicates that are present accommodate to the porous structure and fill the pores to produce a substantially fully filled structure which is important toward achieving a vacuum-tight joint ultimately. The silicates also wet the ceramic body and the porous metal structure, producing a bond which is stronger than the ceramic body. In addition, the structure is such that, upon subsequent heating during brazing or soldering, the silicates do not bleed to the surface and interfere with adherence of the solder or braze to the metallization.

One of the features of the invention is the use of a blend or coated and uncoated particles of molybdenum or tungsten metal. The use of coated particles permits lower metallizing temperatures to be used. With previous processes, metallizing temperatures in the range of 1450° to 1750° C. were used. The novel process requires lesser temperatures in the range of 1100° to 1500° C. As the proportion of coated particles to uncoated particles increases, the required metallizing temperature decreases. Compositions wherein all the particles are uncoated require temperatures which are in the higher range previously used. Compositions wherein all the metal particles are coated require the lowest metallizing temperature; but, the time-temperature relationship during metallizing is too difficult to control to produce a sufficiently uniform product. Thus, a blend of coated and uncoated metal particles provides both the advantage of lower metallizing temperature and the advantage of adequate control of the process. The relative weight of the metal coating on the metal particles influences the metallizing temperatures in the same way but to a lesser extent.

The sintered metal layer may be used by itself to form a bond with a metal part or with a similarly metallized ceramic part. Alternatively, the sintered metal layer may be used as a base for the deposition of another metal. For example, the metallized ceramic body is treated in a plating bath to deposit a coating of nickel metal about 0.1 to 0.2 mil thick upon the metallized portion of the ceramic. The ceramic body may then be bonded at its nickel-plated areas to either a metallized ceramic part or to a metallic part using brazes such as pure copper, or silver-copper alloys. Alloys of nickel-gold, nickel-copper-gold and nickel-copper do not require a plate layer on the metallization.

Brazing is conveniently performed by holding the ceramic body in a jig, positioning the braze between the metallized area on the body and the part to which it is to be joined and then heating the assembly in a reducing ambient atmosphere for about 3 to 5 minutes at a temperature a little above the melting point of the particular braze used. For a 72 silver-28 copper braze, a temperature of 815° C. is preferred. When pure copper is used as the braze, a temperature of about 1110° C. is preferred. After brazing, the assembly is cooled, and the brazed joint is ready for use. The joint is vacuum tight and has a flexural strength about equal to or greater than the flexural strength of the ceramic body, with a maximum strength of about 70,000 pounds per square inch.

We claim:
1. A method for metallizing a surface of a ceramic body comprising
   1. coating a surface of a ceramic body with a metallizing composition consisting essentially of:
      10 to 90 weight parts uncoated molybdenum or tungsten metal particles
      4 to 80 weight parts coated molybdenum or tungsten metal particles each of said particles having an adherent coating consisting essentially of at least one member of the group consisting of nickel, iron and cobalt metal
      2 to 27 weight parts sinter powder consisting essentially of a combination of silicates in the following proportions per 100 weight parts of coated and uncoated metal particles: 1 to 12 weight parts magnesium aluminum silicate, 1 to 12 weight parts calcium aluminum silicate and 0.2 to 3.0 weight parts manganese silicate and then
   2. heating said coated ceramic body in the range of about 1100 to 1500° C. in a reducing atmosphere to produce a sintered metal coating on said ceramic body.
2. The method defined in claim 1 wherein said ceramic metallizing composition includes also up to 10 weight parts manganese metal particles.
3. The method defined in claim 1 wherein said uncoated particles are molybdenum metal particles and said coated particles are nickel coated molybdenum particles.
4. The method defined in claim 1 wherein said ceramic body is a beryllia ceramic.
5. The method defined in claim 1 wherein said ceramic is an alumina ceramic.
6. The method defined in claim 1 wherein said reducing atmosphere consists essentially of 10 to 40 weight percent hydrogen and 90 to 60 weight percent of nitrogen, and the dew point of said atmosphere is higher than −25° C. up to +20° C.
7. The method defined in claim 6 wherein said metallizing composition consists essentially of about:
   57 weight parts uncoated molybdenum metal powder
   39 weight parts nickel coated molybdenum metal powder and
   15 weight parts sinter powder.
8. The method defined in claim 7 wherein said metallizing composition contains also about 6 weight parts manganese metal powder.
9. The method defined in claim 8 wherein said ceramic body is a beryllia ceramic and said body is heated at about 1200 to 1300° C.
10. The method defined in claim 6 wherein said metallizing composition consists essentially of about:
    76 weight parts uncoated molybdenum metal powder
    19 weight parts nickel coated molybdenum metal powder, and
    10 weight parts sinter powder.

* * * * *